(12) United States Patent
Edlinger et al.

(10) Patent No.: US 7,070,280 B2
(45) Date of Patent: Jul. 4, 2006

(54) METHOD FOR THE GENERATION OF LIGHT OF A GIVEN POLARIZATION STATE

(75) Inventors: Johannes Edlinger, Feldkirch (AT); Claus Heine-Kempkens, Chur (CH); Detlev Hausler, Triesen (LI)

(73) Assignee: Unaxis Balzers Aktiengesellschaft, Balzers (LI)

( * ) Notice: Subject to any disclaimer, the term of this patent is extended or adjusted under 35 U.S.C. 154(b) by 184 days.

(21) Appl. No.: 09/952,077

(22) Filed: Sep. 14, 2001

(65) Prior Publication Data

US 2003/0007245 A1  Jan. 9, 2003

(30) Foreign Application Priority Data

Jul. 4, 2001 (CH) ..................... 1236/01

(51) Int. Cl.
*G03B 21/28* (2006.01)
*G02B 5/30* (2006.01)
*G02B 27/28* (2006.01)
*G02B 6/00* (2006.01)
*F21V 9/14* (2006.01)
*F21V 7/04* (2006.01)
*G02F 1/1335* (2006.01)

(52) U.S. Cl. .................. 353/20; 353/37; 353/84; 353/99; 353/102; 359/487; 359/495; 359/497; 359/861; 362/19; 362/341; 362/551; 349/9; 385/133

(58) Field of Classification Search ............... 353/20, 353/84, 97–99, 122, 37, 102; 359/495, 497, 359/483, 485, 487, 850, 861, 871, 879; 362/19, 362/359, 551; 349/62, 9; 385/48, 133

See application file for complete search history.

(56) References Cited

U.S. PATENT DOCUMENTS

| | | | |
|---|---|---|---|
| 4,525,413 A | 6/1985 | Roger et al. ................. | 428/212 |
| 5,856,855 A | 1/1999 | Mol et al. ....................... | 349/65 |
| 5,884,991 A | 3/1999 | Levis et al. .................. | 353/122 |
| 6,064,523 A | 5/2000 | Budd et al. .................. | 359/485 |
| 6,078,363 A * | 6/2000 | Masuda et al. .............. | 348/752 |
| 6,101,032 A | 8/2000 | Wortman et al. ........... | 359/500 |
| 6,139,157 A | 10/2000 | Okuyuma .................... | 353/102 |
| 6,208,463 B1 | 3/2001 | Hansen et al. .............. | 354/486 |
| 2001/0008470 A1 * | 7/2001 | Dewald ...................... | 359/850 |

FOREIGN PATENT DOCUMENTS

JP  04-127120  * 4/1992

* cited by examiner

Primary Examiner—W. B. Perkey
Assistant Examiner—Rochelle Blackman
(74) Attorney, Agent, or Firm—Notaro & Michalos PC

(57) ABSTRACT

A method and apparatus or configuration generates light of a given polarization state (P). A polarization state-sensitive beam splitter is acted upon by light (L) at an input ($E_1$), light ($L_P$) of the given polarization state being output by the beam splitter (1) at a first beam splitter output ($A_1$). Light ($L_S$) with polarization state (S) that is perpendicular to the given state (P) is changed with respect to this state and also output. The light of the changed polarization state again acts upon the polarization state-sensitive beam splitter at the input ($E_1$). The apparatus or configuration achieves this by having the optic input ($E_3$) of a polarization state-changing structural element whose optic output ($A_3$) is operationally connected to the optic input ($E_1$) of the polarization state-sensitive beam splitter, operationally connected to the second optic output ($A_2$).

22 Claims, 3 Drawing Sheets

METHOD FOR THE GENERATION OF LIGHT OF A GIVEN POLARIZATION STATE

Figure 1:
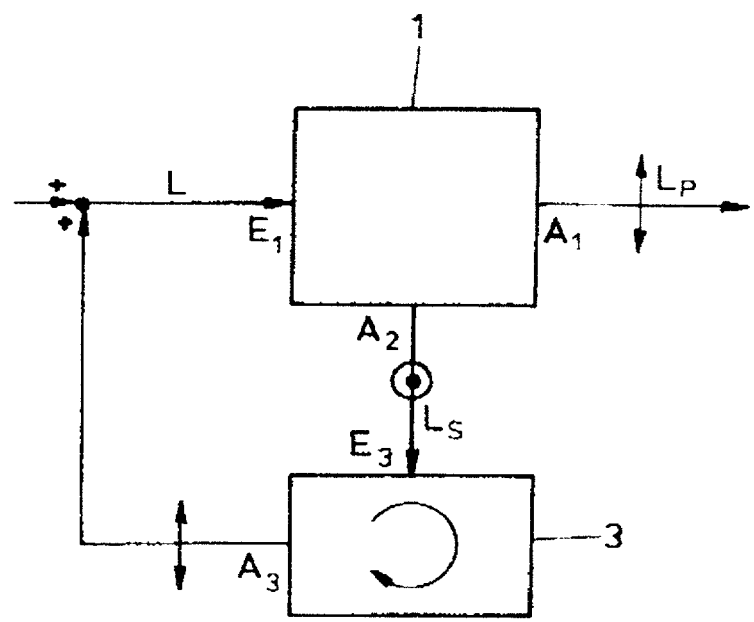

The present invention relates to a method for the generation of light of a given polarization state in which a polarization state-sensitive beam splitter is acted upon at an input by light, light of the given polarization state is output by the beam splitter at a first output, light with a polarization state differing from the given state is changed with respect to this state and is output. Furthermore, the present invention relates to a polarizer configuration, an illumination configuration, a projection system as well as their uses.

U.S. Pat. No. 6,139,157 discloses a method of the above described type or an illumination system operating according to this method. After traversing through a light tunnel as well as a lens system, nonpolarized light is supplied to a beam splitter sensitive to a polarization state. While the component of the supplied nonpolarized light, which is polarized in a given polarization state, is output at a first output of the beam splitter, the component of the nonpolarized light with a state differing from a given polarization state is changed with respect to this state and output at a second output of the beam splitter.

This approach has the following disadvantages:

Since the light lastly polarized in a given state exits at two separate regions or outputs of the beam splitter, the subsequent illumination optics must be layed out for the precise acceptance of the light, which makes the entire system relatively inflexible and voluminous.

The present invention addresses the problem of providing a method or a polarizer configuration operating according to this method, which eliminates said disadvantage.

This is solved with the above described method thereby that the light of polarization change of state acts again on the input of the polarization-sensitive beam splitter.

Therewith is achieved that virtually the entire nonpolarized light finally with the desired polarization state exits from the beam splitter. This takes place since the light is output and rotated at the second output until it has at least approximately the given polarization state and subsequently also exits the beam splitter at the first output.

In a preferred embodiment of the method according to the invention which, as will be shown, opens extremely advantageous realization capabilities, the polarization state of the light is changed through reflection, preferably through multiple reflection.

In a further preferred embodiment, in particular combinable preferably with the above reflection change of state, the polarization state of the light is changed through a given delay, preferably by means of at least one retarder element.

From U.S. Pat. No. 6,139,157 is known to focus the light, which is supplied to the beam splitter, initially from a light source with reflector onto the aperture of a light tunnel and to homogenize the intensity distribution of the light through the multiple reflection effect of the light tunnel at its peripheral inner faces at the output side. Consequently, it is known to provide for the nonpolarized light supplied to the beam splitter a path with multiple reflection for reasons of intensity homogenization.

In an extremely advantageous embodiment of the method according to the invention the light, before the action onto the beam splitter sensitive to the polarization state is also guided through a light tunnel structural element, with reflecting periphery and the light with a state perpendicular to the given polarization state is guided from the end opposing the illumination source into the light tunnel structural element and reflected thereon. Therewith the light tunnel structural element provided for the nonpolarized light for reasons of intensity homogenization is simultaneously utilized in order to change the light component not polarized in the given state with respect to its polarization state and supply it again to the input of the beam splitter. Therewith a highly compact and simple realization of the method according to the invention is generated.

At at least one region in the structural element acted upon by the light preferably at least one element is provided effecting a given defined polarization change of state, preferably at least one retarder plate.

In a further preferred embodiment the light, with which the input of the beam splitter is acted upon, is generated by means of a light source and a reflector and at least a portion of the light, with a state perpendicular to the given polarization state, at least also is reflected on the reflector and the light reflected there supplied to the input of the polarization state-sensitive beam splitter.

The last described approach is in particular suitable in combination with provision of the explained light tunnel structural element, thereby that with said reflector virtually a closed volume to the aperture of the light tunnel structural element is provided such that in any case light components which originate from the second output of the beam splitter and exit through the aperture of the light tunnel are not lost but rather are reflected by the reflector back into the light tunnel structural element. The reflector can therein preferably be formed similarly to an Ulbricht sphere.

In a further preferred embodiment of the last mentioned approach an element effecting a given polarization change of state is also provided on the reflector face.

A polarizer configuration according to the invention is specified in the claims, with preferred embodiments according to other claims. An illumination configuration according to the invention is specified in still further claims as is a projector system. The configurations according to the invention as well as also the method according to the invention is singularly well suitable in the application in the frame of projectors or illumination apparatus.

Figure 2:
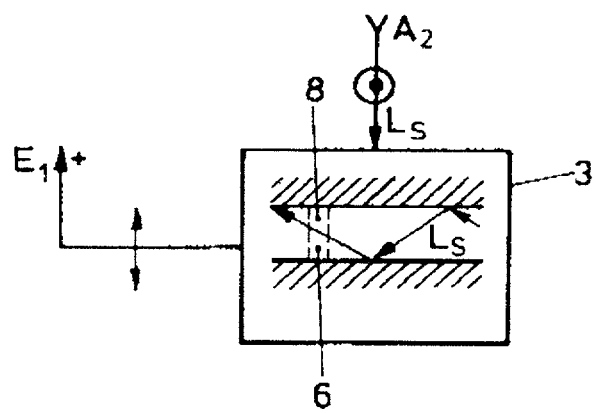
Figure 3:
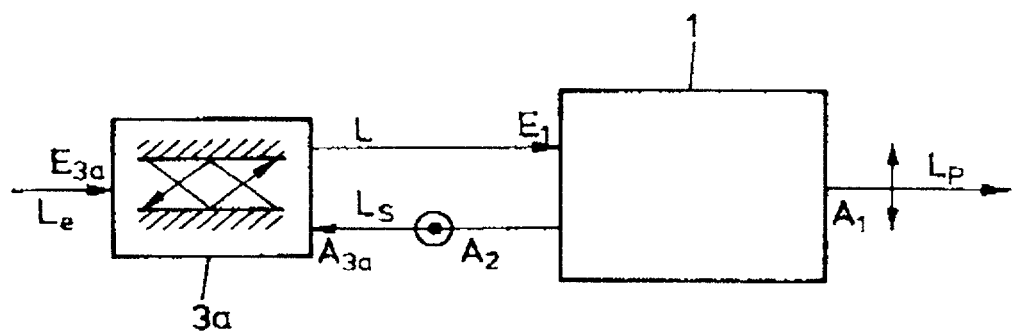
Figure 4:
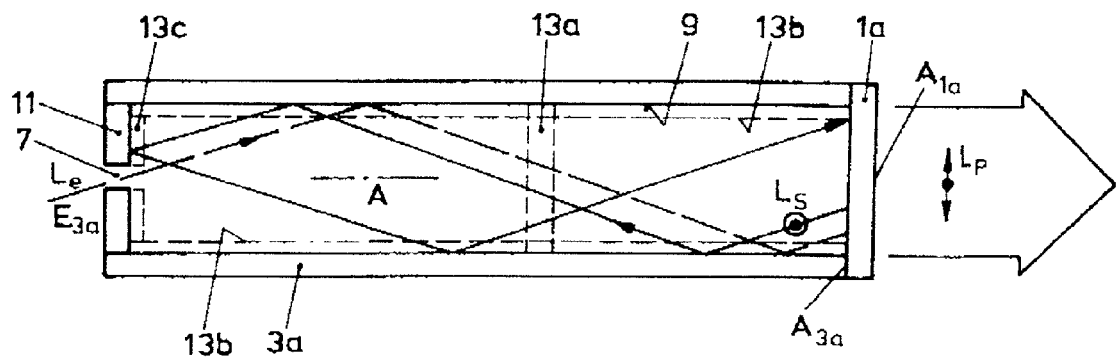
Figure 5:
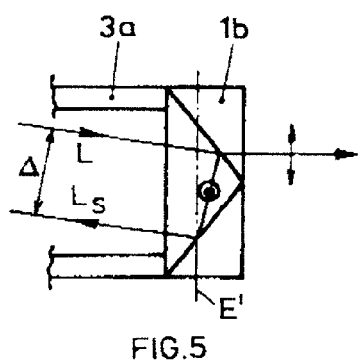
Figure 6:
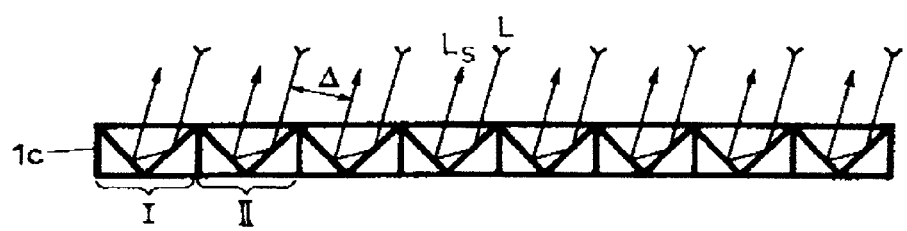
Figure 7:
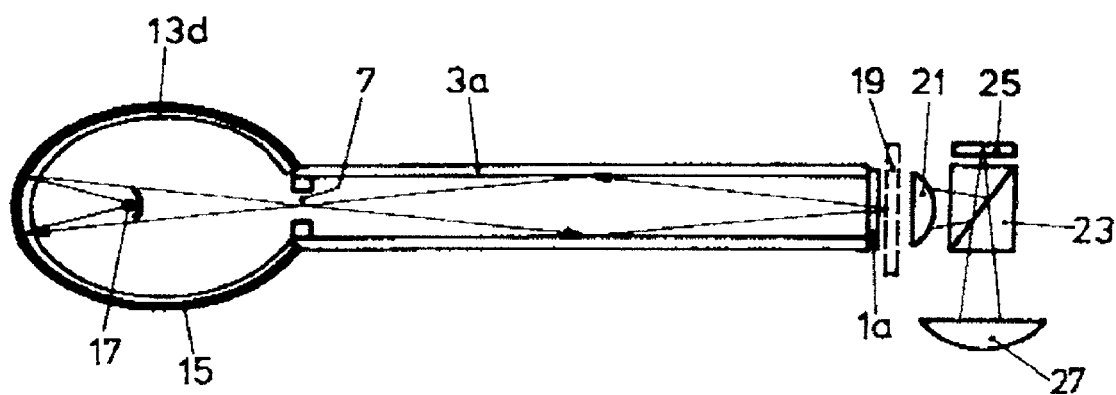

In the following the invention will be explained by example in conjunction with Figures. These depict:

FIG. 1 in conjunction with an optic function block/signal flow diagram, the principle of the method according to the invention, according to which also operates the polarizer configuration according to the invention;

FIG. 2 in a representation analogous to that of FIG. 1, a preferred embodiment of a structural element rotating or changing polarization;

FIG. 3 in a representation analogous to FIGS. 1 and 2, a preferred embodiment of the method according to the invention or the configuration according to the invention, in which the same assembly is utilized for the homogenization of the light intensity distribution as well as also for the rotation or change according to the invention of the polarization state;

FIG. 4 a preferred embodiment of the approach depicted in conjunction with FIG. 3;

FIG. 5 a first preferred embodiment of a provided polarization state-sensitive beam splitter;

FIG. 6 a further preferred embodiment of the polarization state-sensitive beam splitter applied according to the invention, and FIG. 7 schematically, a projection configuration according to the invention using the method according to the invention or the polarizer configuration according to the invention in further preferred embodiment.

In conjunction with FIG. 1, the fundamental principle of the present invention will be explained first. For this purpose serves an optic function block/signal flow diagram. Nonpolarized light L, such as conventionally is emitted by projector light sources, is supplied to the optic input $E_1$ of a polarization state-sensitive beam splitter element 1. The polarization direction-sensitive beam splitter 1 outputs at its one optic output $A_1$ the component $L_P$ of the nonpolarized light L, which has a given polarization state, for example is P-polarized. The component $L_S$ of the nonpolarized light L, which with respect to the polarization state P of the light output at $A_1$ has a perpendicular polarization state, and, following the example, is thus S-polarized, is output from the beam splitter 1, sensitive to the polarization state, at its second optic output $A_2$. Conventionally, the one component of said light L, thus for example $L_P$, is transmitted through a polarization filter layer system at the polarization state-sensitive beam splitter 1, the other, here for example $L_S$, is reflected.

At the optic output $A_1$ light $L_P$ with the desired polarization state exits. The light $L_S$ exiting at output $A_2$ of the beam splitter 1 sensitive to the polarization state is changed or rotated at a polarization state rotation or changing element 3 in its polarization state and supplied again to the optic input $E_1$ of the polarization state-sensitive beam splitter 1. Therewith, virtually the entire light 1 supplied to the beam splitter 1 and, initially nonpolarized, exits as $L_P$ with the desired polarization state, for example P.

As shown in FIG. 2, the polarization state rotation element 3 can preferably be realized thereby that according to FIG. 1 the light $L_S$ exiting at the optic output $A_2$ is subjected to multiple reflection. As a rule the polarization state of the light is not retained through reflections. Even if the polarization state of light $L_S$ is only slightly rotated, a component is P-polarized and output at output $A_1$ as a component of $L_P$. Remaining components require possibly several cycles over configuration 3, until their polarization direction corresponds to the required P polarization.

As shown in FIG. 2, the rotation of the polarization state at configuration 1 can be augmented preferably additionally by providing discrete polarization direction rotation elements, such as in particular so-called retarder elements, by means of which, according to the principle of FIG. 1, a $\lambda/2$ delay of the light $L_S$ is introduced, i.e. a 90° rotation of the polarization direction.

In block 3 of FIG. 2 are schematically shown, for one, a multiple reflection configuration 6 for light $L_S$, for another, in dashed lines, a built-in additional discrete polarization direction rotation element, such as for example a retarder plate 8.

As stated in the introduction, it is often desired in many applications, such as in particular with projectors, to provide a light beam whose intensity distribution is of maximum homogeneity. In this connection it is known, as has also been explained in the introduction, to supply the light originating from a very small region of a light source, first to a light tunnel, whereon, through multiple reflection of the light originating from the light source, is made available at the output side a homogeneous intensity distribution adapted to the form of an image-providing element.

But if at the input side of the polarization state-sensitive beam splitter 1 a structural element multiply reflecting the input light L for reasons of homogenization is provided, this provided multiply reflecting structural element—as shown again schematically in FIG. 3—is preferably simultaneously employed as polarization direction-rotating structural element, analogous to element 3 of FIGS. 1 and 2.

According to FIG. 3, light $L_e$ is incident on a multiply reflecting structural element 3a, as stated for example and preferably onto the optic input $E_{3a}$ of a light tunnel, and, after multiply reflection is, after it is homogenized in terms of intensity, supplied to input $E_1$ of the polarization state-sensitive beam splitter 1.

At optic output $A_2$ which is not identical to the optic input $E_1$, the light $L_S$ not having the desired polarization state, is conducted back to the output $A_{3a}$ of the multiply reflecting element 3a, where, after multiple reflection, it is reflected back and, as component of light L, with rotated polarization direction again supplied to the polarization-sensitive beam splitter 1. In this way a multiply reflecting structural element 3a, provided already for reasons of intensity homogenization, is utilized, in which, as will yet be explained, again specific discrete polarization direction-rotating elements can be provided such as retarder plates, the polarization state rotation to be provided according to the invention, as was explained in conjunction of block 3 in FIG. 1 or 2, can also be realized.

In FIG. 4 a preferred embodiment form of the preferred embodiment principle, explained in conjunction with FIG. 3, is depicted. Light $L_e$, for example from a projection light source, enters through aperture 7 at input $E_{3a}$ of light tunnel 3a and, if it does not progress approximately parallel to the optic axis A of the light tunnel, is reflected once or multiply at the highly reflecting internal peripheral walls 9 of light tunnel 3a.

The incident light or its path of rays is entered in FIG. 4 in dashed lines.

Preferably immediately at output $A_{3a}$ of light tunnel 3a the polarization state-sensitive beam splitter 1a is provided at whose optic output $A_{1a}$ exits the light $L_P$ of desired polarization state and with homogeneously distributed intensity.

Following the explanations regarding FIG. 3, the light $L_s$ deviating from the desired polarization state—here P—is guided back into light tunnel 3a, as is represented by the light beam depicted by example and with full lines in FIG. 4, where, after multiple reflections, lastly reflected on the light tunnel termination 11 encompassing aperture 7 and developed so as to be reflecting on the inside, it is guided back again at output $A_{3a}$ of the light tunnel to the polarization state-sensitive beam splitter 1a with the polarization state rotated by the multiple reflection. Therewith, the light polarized after this rotation in the desired direction or in the desired state exits again as a component of light $L_P$ from the beam splitter 1a. The reflecting internal wall of termination 11 is oriented parallel to the reflecting plane or its average position E' (see FIG. 5) at beam splitter 1a.

In a preferred embodiment of the realization according to FIG. 4, between the input aperture 7 and the output $A_{3a}$ of light tunnel 3a or the input of the polarization state-sensitive beam splitter 1a, one or several optic elements are provided which effect a discrete given rotation of the polarization state. As shown in FIG. 4 in dashed lines, such polarization state-rotating elements, such as for example and preferably $\lambda/4$ retarder plates, can be provided in cross section planes of the light tunnel 3a, as depicted at 13a, and/or on the peripheral wall of the light tunnel 3a, as shown at 13b, and/or at the input-side termination 11, defining the input aperture 7 of light tunnel 3a, as shown in FIG. 4 at 13c. In any case, providing such a polarization state-rotating element, in particular a $\lambda/4$ retarder plate, at the termination 11 encompassing the input aperture 7, as shown at 12c, is preferred. Due to the twofold traversing of a $\lambda/4$ retarder path, light $L_S$ undergoes therein a 90° rotation of the polarization state.

As already represented in FIG. 4, as the beam splitter 1a sensitive to the polarization state advantageously one that is plate-shaped is employed. Depending on the occurring light intensity, the decision has to be made whether such a polarization beam splitter based on synthetic materials can be applied or a beam splitter which is built with cholesteric filters on glass substrates.

But it is also possible to use a polarization beam splitter 1b, such as is depicted in FIG. 5, realized on the basis of three coated glass prisms.

If a minimum parallel shift Δ of the light L and $L_S$ incident on the beam splitter 1b is desired, preferably, and as shown in FIG. 6, the beam splitter selective with respect to the polarization state, and now denoted as 1c, is realized as an array of three-prism structures I, II, . . . . The finer its structure, the less said parallel shift Δ.

In view of FIG. 4, it is furthermore evident that light $L_S$ which after the reflections is not incident on the termination 11 encompassing the input aperture 7, but rather exits the light tunnel through the input aperture 7, is lost. In FIG. 7, within the scope of a projector example according to the invention, the solution of this problem is shown. A reflector 15 focusing light of a light source 17 onto the input aperture 7, is developed such that that from the polarization state-sensitive beam splitter 1a or 1b or 1c cannot escaped from the system and is also reflected on reflector 15 into the light tunnel 3a. The reflector 15 can essentially be layed out corresponding to the shape of an Ulbricht sphere.

Apart from the already described elements, the projector specifically according to the invention comprises a color shutter 19 as well as a lens system 21, in addition to a further beam splitter 23, which, due to the polarization state-selective beam splitter 1a, according to the invention already provided, does not absolutely need to be developed as a polarization state-sensitive beam splitter. Lastly, 27 denotes a projection lens.

Furthermore, as shown and described in conjunction with FIG. 7, on reflector 15 a discrete polarization direction-rotating element can be provided, denoted by 13d in FIG. 7.

With the color shutter preferably provided in FIG. 7, for example with three color-selective transmission ranges (not shown), for example selectively transmitting red, green and blue, the color modulation of light $L_P$ is carried out. The color shutter 19 is preferably developed as color wheel. As the image-providing element 25 preferably an array of light valves operating in reflection is provided, in which by pixels and by providing the color shutter 19 synchronously with the latter, the particular pixel intensities on the projected image are selected.

The beam splitter sensitive to the polarization state can be an element which transmits light of one wavelength range $\Delta\lambda_1$ in a first polarization state and reflects it in a second polarization state perpendicularly to it, while it transmits light of another wavelength range $\Delta\lambda_2$ in the second polarization state and reflects it in the first.

Subsequently, from the splitter exits light with wavelength-dependent polarization state. Such a wavelength-dependent polarization distribution is frequently required with projectors, in particular with projectors based on reflecting LCDs. The polarization state-sensitive element can be structured of a retarder stack and a succeeding polarization beam splitter, acting jointly as wavelength-selective polarization state-sensitive beam splitter.

The invention claimed is:

1. A method for generating light of predetermined polarization from input light of different polarization, comprising the steps of:

providing a hollow tubular member having a light input and an optical axis and a light-reflecting inner surface parallel to the optical axis and a light-reflecting further surface along a part of a cross-sectional plane of a hollow space of said tubular member, the further surface being normal to the optical axis, remote from said light input and in said hollow space;

conducting said input light into and along said hollow tubular member, for generating output light from said tubular member; and subjecting said output light from said tubular member to polarization-selective splitting, for generating output light of said splitting of said predetermined polarization and generating reflected light of said splitting and of different polarization that is reflected back into said tubular member and onto said light-reflecting inner and further surfaces.

2. The method of claim 1, further comprising providing a predetermined delay for said reflected light within said tubular member.

3. The method for claim 2, wherein said predetermined delay is performed at least one of along said reflecting inner surface of said tubular member and along said further surface.

4. The method of claim 1, wherein a delay of light in the tubular member is performed by at least one of said reflecting inner surface and said reflecting further surface.

5. The method of claim 1, further comprising the step of subjecting said reflected light to a predetermined delay by means of at least one retarder plate.

6. The method of claim 1, comprising selecting said predetermined polarization dependent on wavelength of light.

7. The method of claim 1, further comprising generating said input light by means of a light source comprising a reflector and reflecting a part of said reflected light emanating from said hollow tubular member at said reflector back into said hollow tubular member.

8. The method of claim 7, further comprising delaying said light by a predetermined delay at said reflector.

9. A light polarization apparatus having a light input for light and an output for light of predetermined polarization and comprising:

a hollow tubular member having the light input, an optical axis and a light-reflecting inner surface parallel to the optical axis and a light-reflecting further surface along a part of a cross-sectional plane of an inner space of the tubular member that is remote from the light input and is normal to the optical axis and in said inner space;

an open end for inputting said light;

an output end for light passed through and along said hollow tubular member;

a polarization-selective splitter arrangement having an input operationally connected to the output of said tubular member and a first output for light of said predetermined polarization, a second output for light of a polarization different from said predetermined polarization, said second output for said light of different polarization being coupled to said output of said tubular member so as to apply said light of different polarization from said second output back into said tubular member and onto said light-reflecting inner and further surfaces.

10. The apparatus of claim 9, wherein said polarization-selective splitter arrangement forms a closing of said output end of said tubular member.

11. The apparatus of claim 9, wherein said polarization-selective arrangement comprises at least three prisms.

12. The apparatus of claim 9, wherein said polarization-selective splitter arrangement is shaped as a plate.

13. The apparatus of claim 9, further comprising at least one light-delaying element downstream said second output.

14. The apparatus of of claim 13, wherein said delaying element is arranged at least one of along said inner surface or said further surface of said tubular member.

15. The apparatus of claim 14, wherein said delaying element is formed by at least one of said reflecting inner and further surface.

16. The apparatus of claim 9, wherein said further surface is formed by a collar projecting into said tubular member.

17. The apparatus of claim 9, wherein said polarization-selective light splitter comprises at least one of a prism arrangement, a reflecting polarization foil, a cholesteric polarizer.

18. The apparatus of claim 9, wherein said predetermined polarization is dependent from wavelength of light.

19. The apparatus of claim 9, further comprising a light source generating said light input to said tubular member, said light source having a reflector arrangement directed towards said input of said tubular member.

20. The apparatus of claim 9, wherein said reflector defines towards said input of said tubular member an at least substantially closed space.

21. The apparatus of claim 19, wherein said reflector performs a predetermined delay of reflected light.

22. The apparatus of claim 9, further comprising a color shutter between said output of said tubular member and said input of said polarization-selective splitter arrangement.

* * * * *